(12) United States Patent
Greenfield et al.

(10) Patent No.: US 6,438,600 B1
(45) Date of Patent: Aug. 20, 2002

(54) SECURELY SHARING LOG-IN CREDENTIALS AMONG TRUSTED BROWSER-BASED APPLICATIONS

(75) Inventors: Jonathan Scott Greenfield, Holly Springs; John Ryan McGarvey, Apex, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,398

(22) Filed: Jan. 29, 1999

(51) Int. Cl.[7] .............................................. G06F 15/16
(52) U.S. Cl. ...................... 709/229; 709/228
(58) Field of Search ................................ 713/200, 201, 713/156, 157; 380/277; 709/225, 229, 228

(56) References Cited

U.S. PATENT DOCUMENTS

| | | | | |
|---|---|---|---|---|
| 5,958,050 A | * | 9/1999 | Griffin et al. | 713/200 |
| 6,023,764 A | * | 2/2000 | Curtis | 713/200 |
| 6,112,304 A | * | 8/2000 | Clawson | 713/156 |
| 6,233,341 B1 | * | 5/2001 | Riggins | 380/277 |

OTHER PUBLICATIONS

Li Gong, Secure Java Class Loading—Mobile Code Security, IEEE Internet Computing, Nov.–Dec. 1998, pp. 56–61.*
Gary McGraw and Edward Felten, Understanding the keys to Java Security—the sandbox and authentication, Java-World, May 1997, 7 pages.*

* cited by examiner

Primary Examiner—Patrice Winder
(74) Attorney, Agent, or Firm—Jeanine S. Ray-Yarletts; Marcia L. Doubet

(57) ABSTRACT

A method, system, and computer program for securely sharing log-in credentials among trusted browser-based applications. Credentials for a user are automatically shared only among a restricted and authorized set of trusted applications, without requiring the application developer to write code to manage the credentials. A single log-in is used to obtain the user credentials for a particular codebase, and the credentials are then reused for applications in that codebase. The Java sandbox concept is exploited to provide this restricted sharing, such that the credentials are stored in the shared static data area associated with the server and codebase from which the set of trusted applications was downloaded.

9 Claims, 3 Drawing Sheets

SECURELY SHARING LOG-IN CREDENTIALS AMONG TRUSTED BROWSER-BASED APPLICATIONS

BACKGROUND OF THE INVENTION

1. Field of the Invention

The present invention relates to computer security, and deals more particularly with a method, system, and computer program for securely executing code that is invoked within a browser. Credentials for a user are automatically shared only among a trusted set of applications, without requiring the application developer to write code to manage the credentials.

2. Description of the Related Art

The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer. This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added third tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server", reflecting the fact that this middle tier is where the business logic of the application typically resides, and the computers on which the data repositories reside may be referred to as "data servers", or "backend data servers". A data server stores and manages the data that is used by an application.

When a Web page is retrieved from a server and downloaded to a client machine, the page may contain static predefined content formatted using HTML (HyperText Markup Language). In addition, the Web page may contain dynamically-executable content. One way in which dynamic content can be embedded in a Web page is through use of one or more Java applets. Java is a programming language that is widely accepted for writing Web applications, as it is a robust portable object-oriented language defined specifically for the Web environment. ("Java" is a trademark of Sun Microsystems, Inc.) Java attains its portability through use of a specially-designed virtual machine, called a "Java Virtual Machine" (JVM), which runs on the client workstation and enables executable code to adapt to various execution platforms. An "applet" is a small Java program that executes within a Web browser on the client machine. The applet typically is delivered to the client machine from the Web server along with the Web page in which the applet is embedded. When the Web browser accesses and processes a Web page containing an applet, the applet's code is executed (either automatically or in response to an invocation such as the user clicking on an icon, depending on how the applet has been written) to create the dynamic content.

Network computing models are replacing traditional client-server models in the Web environment. A network computing model is a scalable distributed computing infrastructure, enabling a server to provide a client machine with access to applications on demand of the client. With this type of distributed computing, a key concern is limiting application access to authorized clients. When a request for service from an application is received in a client-server or network computing model (that is, when requests for execution are sent from the client to a server, and executed at the server on behalf of the client), a verification process may be performed to determine if the requesting client is in fact authorized to use this service, before the application performs the service. For example, the executing application code often needs to access protected data that is stored on the server. Protected services and data may also be a concern when the code is a locally-executing applet, such that a verification process may need to be implemented on the client machine. This verification process typically uses user credentials, where "credentials" refers to application-specific information (such as a user name or other identifier, a user password, etc.) that identifies the requesting user at the client machine. These credentials are compared to a previously-defined, stored set of the credentials for all authorized users. If the credentials match an entry in this stored set, then this user is an authorized user.

For Web-based applications, the security procedures that are used to control access to protected data and/or services are usually implemented independently for each application. This results in redundant effort by programmers, taking time and resources away from addressing the actual requirements of the application itself. Alternatively, HTTP Authentication may be used. HTTP Authentication is a standard technique whereby user credentials are encoded as an HTTP Request header, and authentication challenges are encoded as an HTTP Response header. At least two types of HTTP Authentication mechanisms are currently defined: Basic Authentication and Digest Authentication. Basic Authentication is quite common, and uses plaintext transmission of passwords. Digest Authentication, on the other hand, sends credentials as digested information, but is not currently supported by many browsers.

The basic authentication scheme is always supported in typical implementations of Java, and the digest scheme may also be supported. When present, these schemes form part of the core Java Development Kit, and are accessed via the java.net.URLConnection class.

Since HTTP Authentication support is implemented in Java classes that are loaded from the local client file system (i.e. the file system on the machine that is running the browser), the Java classes in which the authentication support is provided are accessible to all Java applets, regardless of the codebase and server from which that applet was loaded. The authentication classes store credentials in static class data. Because the classes are available to all applets, all applets—whether trusted or untrusted—have equal access to this stored static class data. (A trusted applet is one that was loaded from a trusted source. The concepts of trusted code and trusted sources are well known in the art.) This equal access prevents using a single set of credentials to distinguish the access rights to those applets which are trusted, instead sharing the user's credentials among all applets running under the browser, creating a potential security weakness.

Accordingly, a need exists for a technique by which these security concerns can be overcome in an efficient manner. The present invention provides a technique for securely sharing user credentials only among a restricted and authorized set of trusted applications.

SUMMARY OF THE INVENTION

An object of the present invention is to provide a technique to enhance security in a Web environment.

Another object of the present invention is to provide a technique whereby user credentials are shared only among a restricted and authorized set of trusted applications.

It is a further object of the present invention to implement this technique using a single log-in in which the user credentials are obtained.

Yet another object of the present invention is to provide this technique by exploiting the services of the Java sandbox, such that application developers do not have to write code to manage the credentials.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process, system, and method for use in a computing environment having a connection to a network, for securely sharing log-in credentials among trusted browser-based applications, comprising: requesting a secure service from an executing one of one or more applets capable of executing within a browser, each of the applets having been loaded from a codebase associated therewith, and wherein each associated codebase may be distinct; searching, responsive to the request, for stored credentials in a shared static data area associated with the codebase from which the executing applet was loaded, wherein each of the distinct codebases has a distinct shared static data area associated therewith; retrieving the stored credentials when the search is successful; and when the search is not successful, prompting a user of the applet to enter a new set of credentials and storing the new set of credentials in the shared static data associated with the codebase from which the executing applet was loaded. Optionally, the technique may further comprise verifying the retrieved stored credentials or the new set of credentials before allowing the requested secure service to continue. In addition, the technique may further comprise: returning an exception to the applet if a result of the verifying step indicates that the user is not authorized to perform the requested secure service; and performing the requested secure service if the result of the verifying step indicates that the user is authorized.

The present invention will now be described with reference to the following drawings, in which like reference numbers denote the same element throughout.

DESCRIPTION OF THE PREFERRED EMBODIMENT

Figure 1:
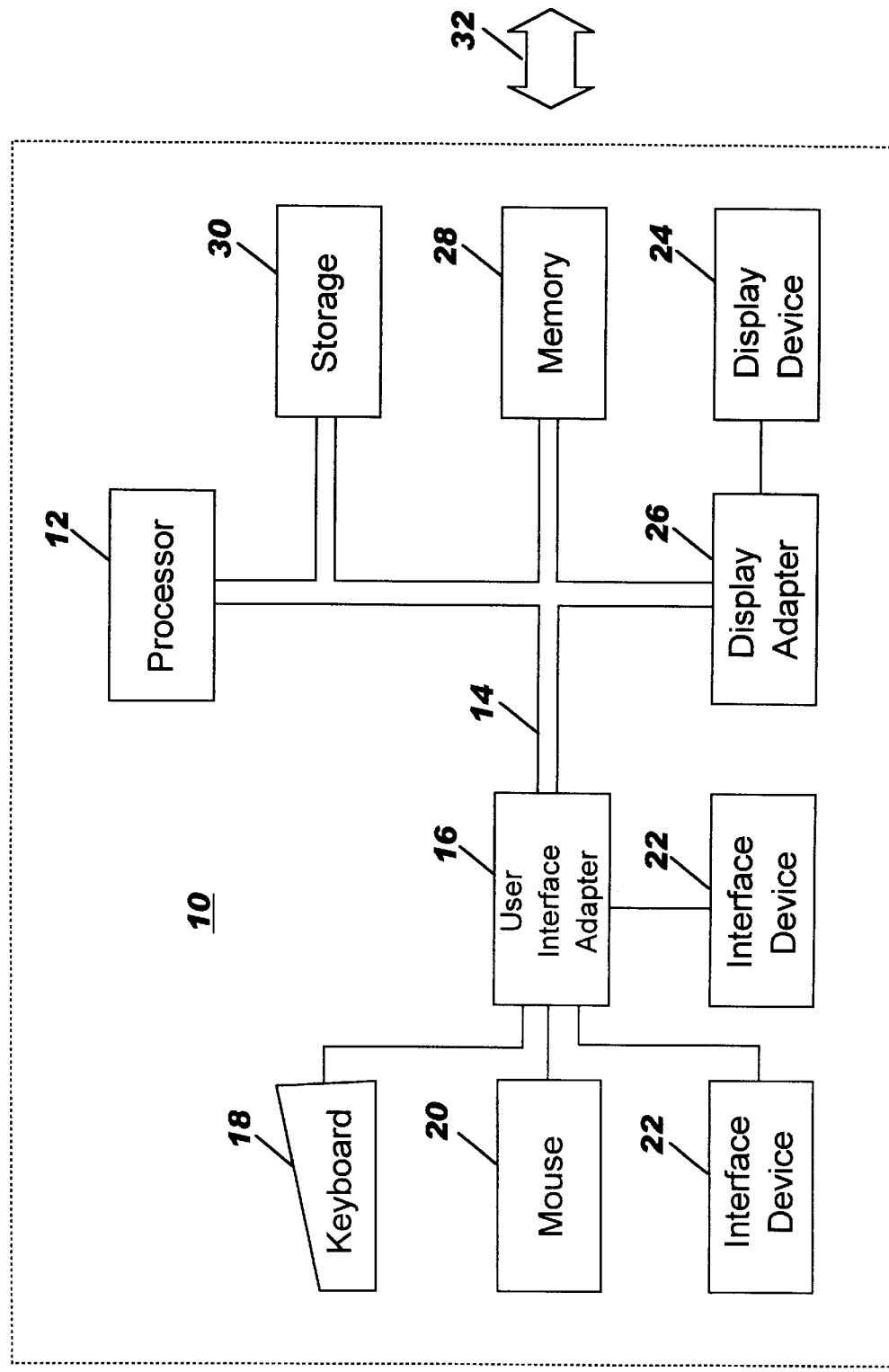
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
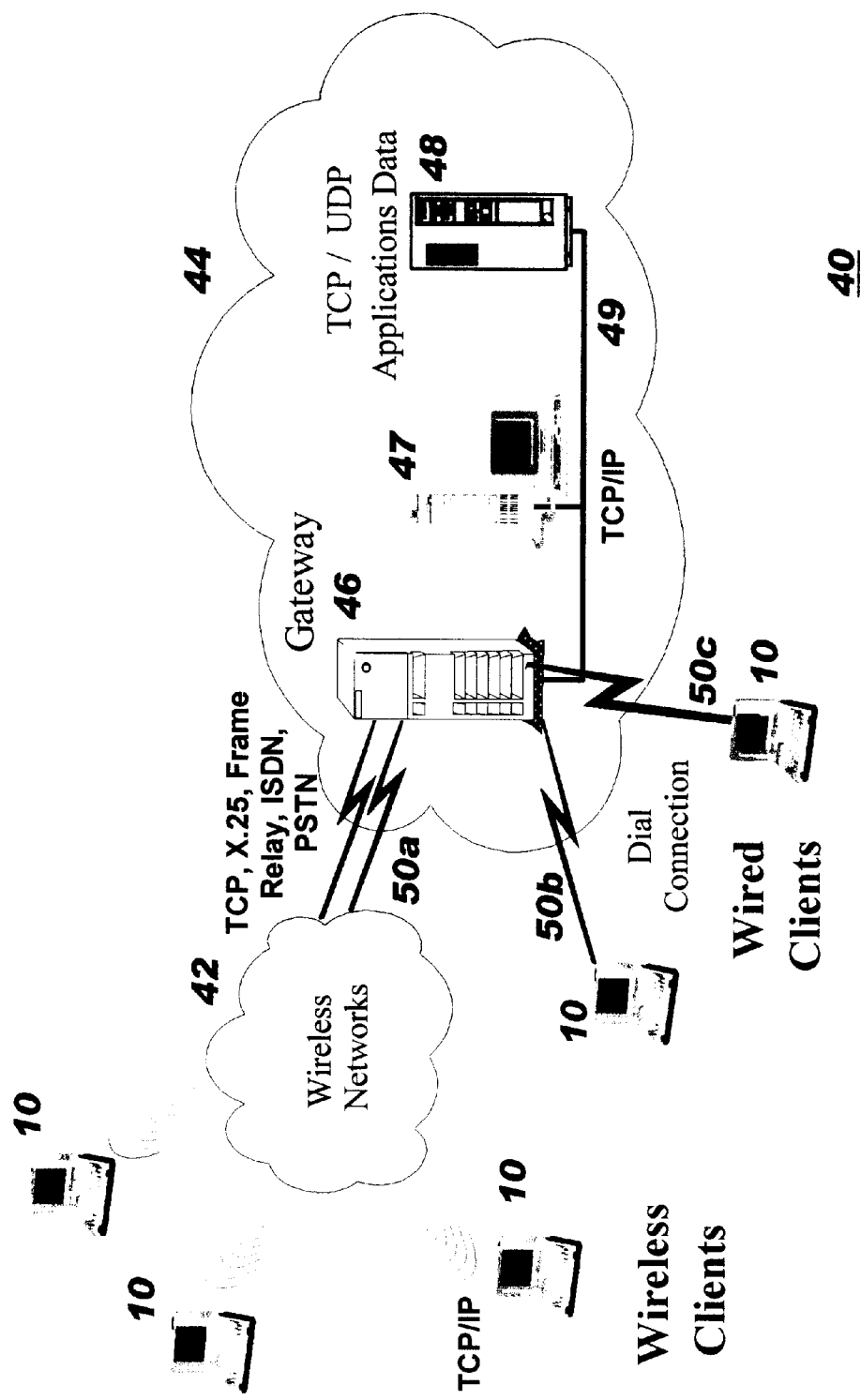
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10.

Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented in a computer software program. The implementation of the software of the present invention operates on a user's workstation, as one or more modules (also referred to as code subroutines, or "objects" in object-oriented programming) which are invoked upon request. In the preferred embodiment, the Java programming language is used. The verification process that may be used with the present invention may also operate on the user's workstation (i.e. on the client machine), or this process may be performed remotely on a server in response to a message sent from the client. The verification process is discussed in more detail below. The logic implementing this invention will preferably be implemented as one or more separate utility modules which are invoked by an executing program (including an executing applet); alternatively, the logic of the present invention may be integrated within the code of such an application program, without deviating from the inventive concepts disclosed herein. The application may be executing in a Web environment, where a Web server provides services in response to requests from a client connected through the Internet. Alternatively, the application may be executing in a corporate intranet (that is, a network owned or managed internally to the user's company) or extranet, or in any other network environment. Configurations for the environment include a client/server network, as well as a multi-tier or network computing environment. These environments and configurations are well known in the art.

When code is downloaded from a remote source to a client machine, there is the potential for the executable code to perform destructive function when it executes. For example, the code may contain what is called a "Trojan horse", meaning code that appears to have one function when in fact it also has hidden functions. An example of this type of hidden function is scanning the machine's hard drive for confidential information (such as a credit card number) and then transmitting that information to a computer over the Internet. Or, the downloaded code may contain a virus that could destroy the files on the machine's hard drive. Security concerns such as these are well known.

Java contains built-in security mechanisms that are designed to limit the destructive potential of applets. One of these mechanisms is the "sandbox" concept, whereby downloaded classes are restricted to accessing system resources (such as applet code and stored data) within their own sandbox. Three system components are involved in implementing the sandbox concept, and are provided as part of a standard Java Development Kit. These components are: the class loader, the byte-code verifier, and the security manager. In particular, the class loader downloads applets and their corresponding classes into a namespace hierarchy that identifies the server and codebase from which the code (i.e. the applets and classes) was downloaded. A static data area is then allocated for use by the code in that namespace. For example, objects to be used by the classes (such as values for variables) are stored in this static data. As an example of how the sandbox concept operates, suppose two different applets use a class "myClass" during execution. If both of these applets are downloaded from the same server and codebase, then both applets may share the same instantiation of the code in "myClass" and the same static data area. If the applets are from different servers and/or codebases, however, the class loader will automatically load a separate instance of "myClass" for each applet, and these separate instances will not share the same static data area. In this latter situation, each of the applets is being restricted to operation within its own sandbox.

More detailed information on the Java sandbox may be obtained by consulting a Java publication. One publication that discusses the sandbox concept is "Secure Computing with Ser. No. 09/240,398 Java™: Now and the Future", and in particular the section thereof entitled "The Java Sandbox". This publication is available on the World Wide Web from Sun Microsystems at the address java.sun.com/security/javaone97-whitepaper.html.

Figure 3:
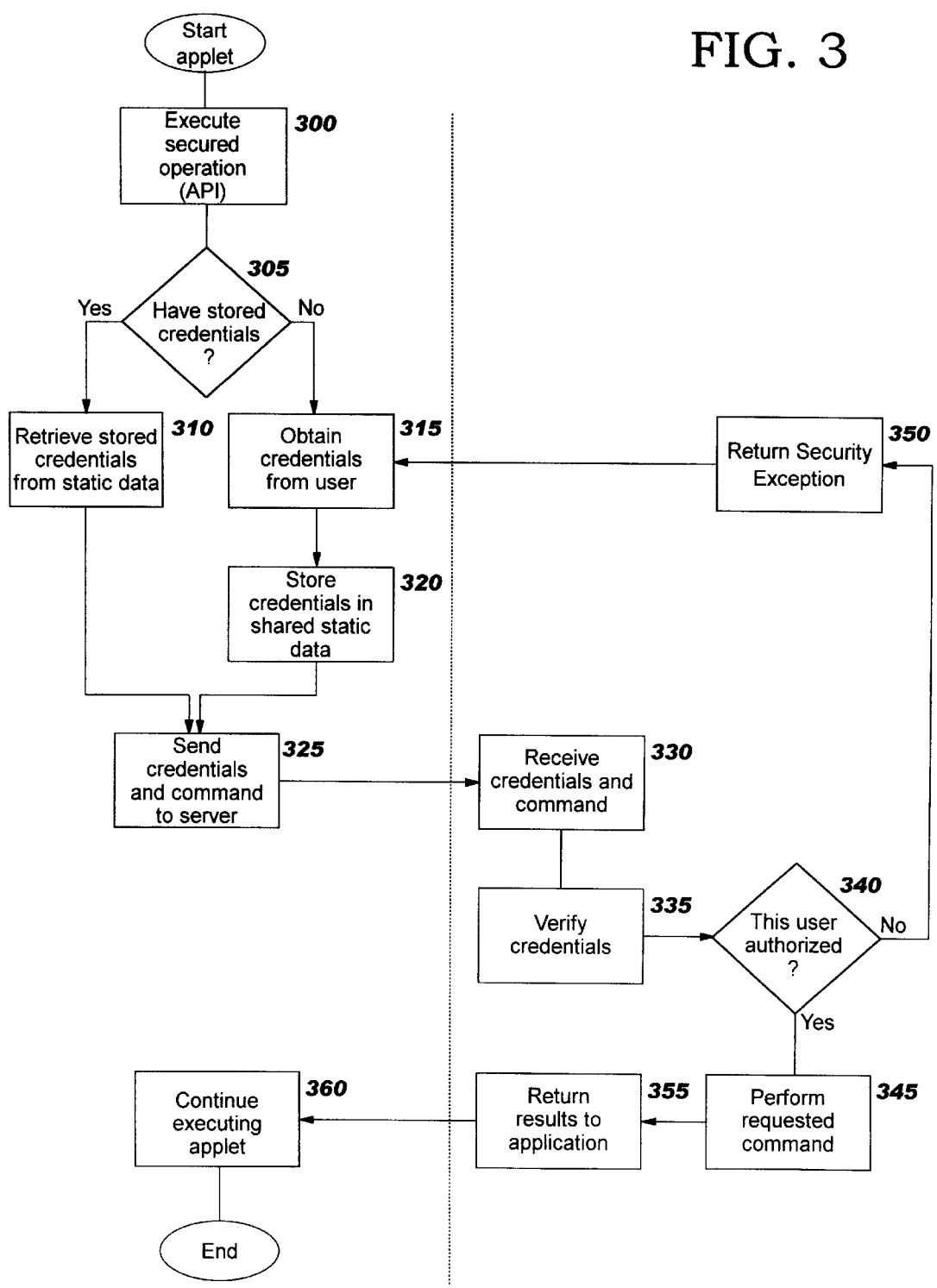
FIG. 3 illustrates a flow chart which sets forth the logic involved to implement the preferred embodiment of the present invention.

The preferred embodiment of the present invention will now be discussed with reference to FIG. 3. The left-hand column of FIG. 3 shows processes that occur in a client workstation, and the right-hand column shows processes that may occur in the server.

The process of the present invention begins at Block 300 when an executing applet requests invocation of a secured operation or access to secured data, for example by invoking an API (application programming interface). (Requests which do not require access to secured operations or secured data are not pertinent to the present invention, and are not accounted for by the logic of FIG. 3. It will be obvious to one of ordinary skill in the art how the logic of FIG. 3 can be incorporated with the logic for executing these other requests.)

At Block 305, a test is made to determine whether stored credentials exist for this applet. According to the present invention, if such credentials exist, they will be stored in shared static data associated with the downloaded class from which the applet is executing. This shared static data is automatically restricted, by the Java sandbox facilities, to use by those applets downloaded from the same server and codebase (as discussed above). By storing the credentials in the static data associated with one particular codebase, the same set of credentials can be used to protect access to all applets from that server and codebase, while preventing any other applets from accessing or using these stored credentials.

If the test at Block 305 has a positive response, then Block 310 indicates that the stored credentials will be retrieved. These retrieved credentials will then be used to determine whether this user will be allowed to perform the requested operation from Block 300. If the test at Block 305 has a negative response, however, then Block 315 will obtain credentials from the user of the executing applet. Techniques for obtaining credentials from a user are well known in the art, and do not form part of the present invention. Preferably, a prompt will be displayed using a window having entry fields, where one such entry field will be provided for each element (e.g. user name, user password, and perhaps a user role such as "administrator" or "user") of the credentials required by this application. At Block 320, the obtained credentials are stored in the shared static data associated with the executing applet's class. (Application-specific validation, not shown in FIG. 3, may optionally be performed on the fields before the credentials are stored. An example of this type of validation is ensuring that a password is at least some predefined number of characters in length. Such validation procedures do not form part of the present invention.)

Control reaches Block 325 when credentials are available for use with this applet, whether those credentials were retrieved from storage (Block 310) or have been newly-entered and stored (Blocks 315 and 320). At this point, it is necessary to verify the credentials to ensure that the applet is to be allowed to perform the secured request for the user having these credentials. The verification process uses techniques which are known in the art, and will be tailored to the requirements of the application and the particular elements comprising the credentials. FIG. 3 illustrates one approach that may be used to verify credentials, and involves transmitting the credentials to a server; alternatively, in an appropriate situation verification can be performed on the local client machine.

Block 325 sends the credentials and the command (i.e. the request for a secured operation) to a server. This information is received by the server at Block 330, and verified (using application-specific processing, as previously stated) at Block 335. A test is made at Block 340 to determine whether the result of the verification process indicates that the user is authorized. If so, Block 345 performs the requested command, and Block 355 returns the result to the client machine. The applet then continues its execution, using these returned results, at Block 360. Alternatively, it may be that for a particular application the requested operation is one that will be performed on the local machine. In this case, Block 345 will be omitted and Block 350 will comprise returning an indication to the client machine that the applet may continue with the processing of the secured operation.

If, however, Block 340 indicates that the user is not authorized, Block 350 returns a security exception to the executing applet on the client machine. As shown in FIG. 3, the user will then be requested to enter his credentials again at Block 315, and the verification of these new credentials will be performed. A limit may optionally be placed upon the number of times a user is allowed to try again to enter authorized credentials. If this number is exceeded without obtaining credentials that identify the user as authorized, it may be assumed that the user is not permitted to use this secured operation, and the applet may terminate execution or take some other appropriate action in response to the authentication failure. It will be obvious to one of ordinary skill in the art how this type of optional limit may be added to the logic of FIG. 3.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment having a connection to a network, computer readable code readable by a computer system in said environment, for securely sharing log-in credentials among trusted browser-based applications, comprising:
   a browser;
   one or more applets capable of executing within said browser, each of said applets having been loaded from a codebase associated therewith, and wherein each associated codebase may be distinct;
   a shared static data area associated with each of said distinct codebases;
   a subprocess for an executing one of said applets to request a secure service;
   a subprocess, responsive to said request, for searching for stored credentials in said shared static data area associated with said codebase from which said executing applet was loaded;
   a subprocess for retrieving said stored credentials when said search is successful; and
   a subprocess for use when said search is not successful, comprising:
      a subprocess for prompting a user of said applet to enter a new set of credentials; and
      a subprocess for storing said new set of credentials in said shared static data associated with said codebase from which said executing applet was loaded.

2. Computer readable code for securely sharing log-in credentials among trusted browser-based applications according to claim 1, further comprising:
   a subprocess for verifying said retrieved stored credentials or said new set of credentials before allowing said requested secure service to continue.

3. Computer readable code for securely sharing log-in credentials among trusted browser-based applications according to claim 2, further comprising:
   a subprocess for returning an exception to said applet if a result of said verifying indicates that said user is not authorized to perform said requested secure service; and
   a subprocess for performing said requested secure service if said result of said verifying indicates that said user is authorized.

4. A system for securely sharing log-in credentials among trusted browser-based applications in a computing environment having a connection to a network, comprising:
   a browser;
   one or more applets capable of executing within said browser, each of said applets having been loaded from a codebase associated therewith, and wherein each associated codebase may be distinct;
   a shared static data area associated with each of said distinct codebases;
   means for an executing one of said applets to request a secure service;
   means, responsive to said request, for searching for stored credentials in said shared static data area associated with said codebase from which said executing applet was loaded;
   means for retrieving said stored credentials when said search is successful; and
   means for use when said search is not successful, comprising:
      means for prompting a user of said applet to enter a new set of credentials; and
      means for storing said new set of credentials in said shared static data associated with said codebase from which said executing applet was loaded.

5. The system for securely sharing log-in credentials among trusted browser-based applications according to claim 4, further comprising:
   means for verifying said retrieved stored credentials or said new set of credentials before allowing said requested secure service to continue.

6. The system for securely sharing log-in credentials among trusted browser-based applications according to claim 5, farther comprising:
   means for returning an exception to said applet if a result of said verifying indicates that said user is not authorized to perform said requested secure service; and
   means for performing said requested secure service if said result of said verifying indicates that said user is authorized.

7. A method for securely sharing log-in credentials among trusted browser-based applications in a computing environment having a connection to a network, comprising the steps of:
   requesting a secure service from an executing one of one or more applets capable of executing within a browser, each of said applets having been loaded from a codebase associated therewith, and wherein each associated codebase may be distinct;
   searching, responsive to said request, for stored credentials in a shared static data area associated with said codebase from which said executing applet was loaded, wherein each of said distinct codebases has a distinct shared static data area associated therewith;
   retrieving said stored credentials when said search is successful; and
   when said search is not successful, prompting a user of said applet to enter a new set of credentials and storing said new set of credentials in said shared static data associated with said codebase from which said executing applet was loaded.

8. The method for securely sharing log-in credentials among trusted browser-based applications according to claim 7, further comprising the step of:
   verifying said retrieved stored credentials or said new set of credentials before allowing said requested secure service to continue.

9. The method for securely sharing log-in credentials among trusted browser-based applications according to claim 8, further comprising the steps of:
   returning an exception to said applet if a result of said verifying step indicates that said user is not authorized to perform said requested secure service; and
   performing said requested secure service if said result of said verifying step indicates that said user is authorized.

* * * * *